UNITED STATES PATENT OFFICE.

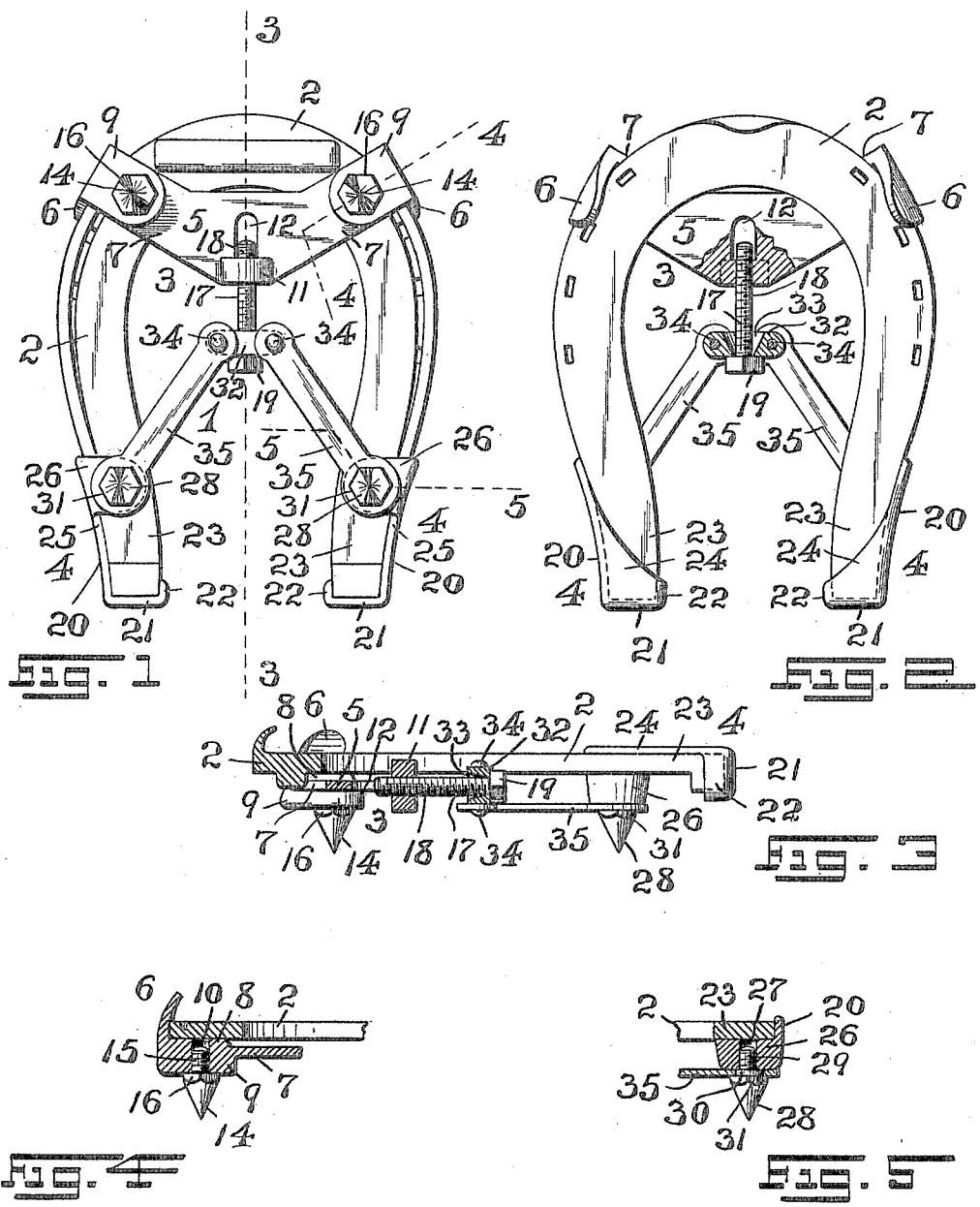

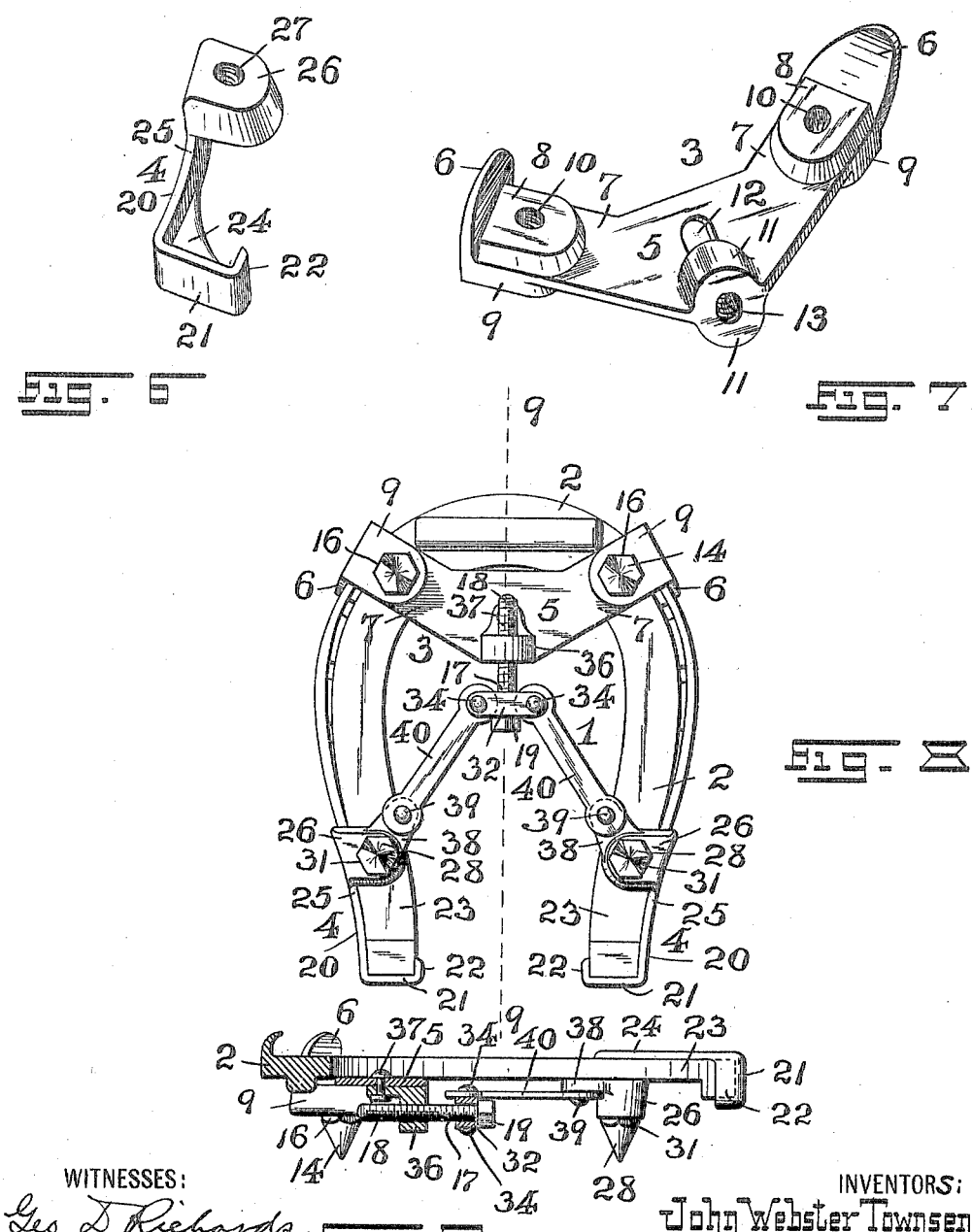

JOHN WEBSTER TOWNSEND AND NELSON SAWYER TOWNSEND, OF NEWARK, NEW JERSEY.

ATTACHMENT OR FIXTURE FOR HORSESHOES.

No. 811,598.     Specification of Letters Patent.     Patented Feb. 6, 1906.

Application filed January 12, 1905. Serial No. 240,692.

*To all whom it may concern:*

Be it known that we, JOHN WEBSTER TOWNSEND and NELSON SAWYER TOWNSEND, citizens of the United States, residing at Newark, in the county of Essex and State of New Jersey, have invented certain new and useful Improvements in Attachments or Fixtures for Horseshoes; and we do hereby declare the following to be a full, clear, and exact description of the invention, such as will enable others skilled in the art to which it appertains to make and use the same, reference being had to the accompanying drawings, and to numerals of reference marked thereon, which form a part of this specification.

The present invention is in the nature of an attachment or fixture for horseshoes, and may be termed an "overshoe," the said attachment or fixture being detachably connected with and clamped upon the under and outer surface of a horseshoe without the necessity of having to remove the said horseshoe from the bottom of the horse's hoof.

Our present invention has for its principal objects to provide a simply-constructed horseshoe attachment or fixture which can be easily adjusted to the size of the horseshoe with which it is to used, the same being securely clamped upon the horseshoe, so as to prevent slipping upon icy and slippery pavements.

A further object of our present invention is to provide an attachment or fixture of the general character hereinafter more particularly set forth which can be easily removed from the horseshoe when not desired for further use and which is provided with sharp pegs or calks, which can readily be removed when they become dull to be quickly replaced by a set of new or resharpened pegs or calks.

Other objects of this invention not at this time more particularly specified will be clearly understood from the following detailed description of our present invention.

The invention consists, therefore, in the novel horseshoe attachment or fixture hereinafter set forth; and, furthermore, this invention consists in the various arrangements and combinations of the devices and parts, as well as in the details of the construction of the same, all of which will be set forth in detail in the following specification and then finally embodied in the clauses of the claim which are appended to and which form an essential part of this specification.

The invention is clearly illustrated in the accompanying drawings, in which—

Figure 1 is a bottom plan view of one form of horseshoe attachment or fixture embodying the principles of our present invention, showing the same in its clamped position upon a horseshoe; and Fig. 2 is a top or reverse view of the parts shown in said Fig. 1, but certain portions of the horseshoe attachment or fixture being represented in horizontal section. Fig. 3 is a longitudinal vertical section taken on line 3 3 in said Fig. 1 of the drawings; and Figs. 4 and 5 are detail vertical sections taken on lines 4 4 and 5 5, respectively, in said Fig. 1. Figs. 6 and 7 are perspective views of two of the holding or clamping members of the horseshoe attachment or fixture. Fig. 8 is a bottom plan view of a horseshoe attachment or fixture of a modified form of construction, but still embodying the principal features of our present invention; and Fig. 9 is a longitudinal vertical section of the same, said section being taken on line 9 9 in said Fig. 8.

Similar characters of reference are employed in the above-described views to indicate corresponding parts.

Referring now to the said drawings, the reference character 1 indicates the complete horseshoe attachment or fixture, which is detachably secured or clamped in its operative position upon the under and outer face of a horseshoe upon the horse's foot substantially in the manner illustrated in the several figures of the drawings The said horseshoe attachment or fixture comprises a front or forward holding or clamping member 3 and a pair of rear or back holding or clamping members 4, which are adjustably connected and are to be detachably secured in position upon the horseshoe 2. The said front or forward holding or clamping member consists, essentially, of a main body 5, preferably of the shape shown in the several figures of the drawings, and formed at its respective ends with upwardly-projecting and suitably-shaped holding or retaining lugs 6. The end members 7 of the said main body 5 are preferably provided upon their opposite sides with enlargements or reinforced portions 8 and 9, provided with the screw-threaded receiving-holes 10, as shown in Figs. 4 and 7 of the drawings. The said main body 5 is also provided with an enlargement or boss 11, back of which the said body 5 is formed with a suitable opening 12, and the said enlargement or boss 11 has a screw-threaded receiving-hole 13, as shown. Of course it will be understood that the various shapes and arrangements of these parts may be changed at will, if desired and, in fact, some of them may sometimes be omitted. Suitably screwed into each hole 10 is the screw-shank 15 of a peg or calk 14, each peg or calk being preferably made cone shape and having a hexagonal or other suitably-formed shoulder 16 for the reception of a wrench whereby the peg or calk can be screwed in place or removed from the hole 10, as may be desired, and all of which will be clearly understood from an inspection of said Fig. 4 of the drawings. Adjustable within the screw-hole 13 of the enlargement or boss 11 is the screw-threaded end 18 of a tightening-bolt 17, the said bolt 17 being also formed with a suitable head or other enlargement 19 for the reception of a wrench or other tightening means to bring the said bolt 17 in its tightened relation with the other parts of the horseshoe attachment or fixture, as will be presently more fully described.

Each rear or back holding or clamping member 4 consists, essentially, of a main body or portion 20, formed with a right-angled end piece 21, which in turn may also be provided with a bent right-angled portion 22. This portion 22 may, however, be dispensed with, if desired. The said main body or portion 20 is preferably outwardly curved, as shown in Figs. 1, 2, and 6, so as to conform to the general contour of the outer surface of the heel portion 23 of the horseshoe 2. Each holding or clamping member 4 is also provided with a supporting-web 24, extending from the inner surface of the main body or part 20 to the inner surface of the right-angled member 21, preferably as shown, and extending laterally from the edge 25 of each main body or part 20 is a lug 26, which is provided with a screw-threaded receiving-hole 27. Suitably screwed into each hole 27 is the screw-shank 29 of a peg or calk 28, each peg or calk 28 being made with a cylindrical offset or part 30 and a hexagonal or other suitably-shaped shoulder 31 for the reception of a wrench, whereby the peg or calk 28 can be secured in place in the manner illustrated in Fig. 5 of the drawings or may be removed from the said lug 26 when necessary.

Loosely arranged upon the body of the bolt 17 is a cross-bar 32, having an opening or receiving-hole 33, preferably of the shape shown in Figs. 2 and 3 of the drawings, to allow for a certain oscillatory movement of said cross-bar 32 upon said bolt 17 during the adjustment of the several parts of the attachment or fixture 1 upon the horseshoe. At its respective ends the said cross-bar 32 is provided with pivotal pins 34, and pivotally connected with each pin 34 and a cylindrical offset or part 30 of each peg or calk 28 is a link, bar, or plate 35 or other suitable connecting means.

In Figs. 8 and 9 we have shown a slightly-modified construction of horseshoe attachment or fixture in which a bolt-receiving lug 36 is pivotally connected, by means of a pin or rivet 37 or the like, upon the main body 5 of the clamping or holding member 3, so as to be capable of an oscillatory motion upon said member. In this construction of horseshoe attachment or fixture the rear or back holding or clamping members 4 are formed with ears 38, extending from the side of each lug 26, as shown, and each ear 38 being provided with a rivet or pin 39, by means of which an end of a link, bar, or plate 40 is operatively connected with the ear 38, as will be clearly understood.

From the foregoing description and from an inspection of the accompanying drawings it will be seen that we have devised a simply-constructed and easily-manipulated attachment or fixture which can be quickly applied to the shoe upon the horse's hoof, the holding-lugs 6 embracing the front portions of the shoe, and the parts 20, 21, and 22 of each rear or back holding member 4 embracing a rear or heel portion of the horseshoe 2, as clearly indicated in the several figures of the drawings, and the various holding or clamping members having been adjusted to the shoe 2 they are brought into their positive grasping engagement with the various parts of the shoe by tightening upon the bolt 17, thus drawing the various parts of the attachment or fixture 1 toward each other and causing them to be tightly bound in their mounted positions upon the shoe.

The attachment or fixture can be easily-applied, serving in icy and slippery weather the same purpose of a newly-calked or sharpened shoe. Furthermore, it will be evident that the pegs or calks when worn down can be supplied with new or resharpened pegs or calks, and there is therefore no necessity of tearing the horseshoe from the hoof every time that a new or sharpened calk is required.

Having thus described our invention, what we claim is—

1. An attachment for horseshoes to prevent slipping, comprising a forward retaining member consisting, essentially, of a main body having oppositely-extending end members, an upwardly-projecting retaining-lug upon each end member adapted to grasp the front portion of a horseshoe, each end member being provided with a screw-threaded receiving-hole, and a calk provided with a screw-shank screwed into each receiving-hole, a pair of rear retaining members arranged upon the heel ends of the shoe, each rear retaining member being provided with a screw-threaded receiving-hole, and a calk provided with a screw-shank screwed into each receiving-hole of a rear retaining member, a screw-threaded lug on the body of said forward retaining member, a screw-bolt in said screw-threaded lug, a cross-bar on said bolt, and connecting-links between the said bar and the rear retaining members, all arranged for drawing the said retaining members toward each other and securing the same in retaining positions upon the shoe, substantially as and for the purposes set forth.

2. In an attachment for horseshoes to prevent slipping, the combination, with a pair of rear retaining members, each member comprising a main body, a right-angled end piece and a web, all arranged to embrace the heel end of a horseshoe, of a forward retaining means consisting, essentially, of a main body having oppositely-extending end members, an upwardly-projecting retaining-lug upon each end member adapted to grasp the front portion of the shoe, a screw-threaded lug on the body of said forward retaining member, a screw-bolt in said screw-threaded lug, a cross-bar on said bolt, and connecting-links between the said bar and the rear retaining members, all arranged for drawing the said retaining members toward each other and securing the same in retaining positions upon the shoe, substantially as and for the purposes set forth.

3. In an attachment for horseshoes to prevent slipping, the combination, with a pair of rear retaining members, each member comprising a main body, a right-angled end piece, and a web, all arranged to embrace the heel end of a horseshoe, and a laterally-extending lug on said body, said lug being provided with a screw-threaded receiving-hole, of a calk provided with a screw-shank screwed into said receiving-hole, a forward retaining means adapted to grasp the forward end of the horseshoe, and means connected with said calks of the rear retaining members and with said forward retaining means for securing the same in position upon the shoe, substantially as and for the purposes set forth.

4. In an attachment for horseshoes to prevent slipping, the combination, with a pair of rear retaining members, each member comprising a main body, a right-angled end piece, and a web, all arranged to embrace the heel end of a horseshoe, and a laterally-extending lug on said body, said lug being provided with a screw-threaded receiving-hole, of a calk provided with a screw-shank screwed into said receiving-hole, a forward retaining means adapted to grasp the forward end of the horseshoe, and an adjusting means connected with said rear retaining members and said forward retaining means for drawing said rear retaining means toward said forward retaining means and securing the same in position upon the shoe, substantially as and for the purposes set forth.

5. In an attachment for horseshoes to prevent slipping, the combination, with a pair of rear retaining members, each member comprising a main body, a right-angled end piece, and a web, all arranged to embrace the heel end of a horseshoe, and a laterally-extending lug on said body, said lug being provided with a screw-threaded receiving-hole, of a calk provided with a screw-shank screwed into said receiving-hole, a forward retaining means consisting, essentially, of a main body having oppositely-extending end members, an upwardly-projecting retaining-lug upon each end member adapted to grasp the front portion of the shoe, each end member being provided with a screw-threaded receiving-hole, and a calk having a screw-shank screwed in each receiving-hole, and a fastening means connected with the central portion of the body of said forward retaining means and with the calks of said rear retaining members for securing the same in position upon the shoe, substantially as and for the purposes set forth.

6. In an attachment for horseshoes to prevent slipping, the combination, with a pair of rear retaining members, each member comprising a main body, a right-angled end piece, and a web, all arranged to embrace the heel end of a horseshoe, and a laterally-extending lug on said body, said lug being provided with a screw-threaded receiving-hole, of a calk provided with a screw-shank screwed into said receiving-hole, a forward retaining means consisting, essentially, of a main body having oppositely-extending end members, an upwardly-projecting retaining-lug upon each end member adapted to grasp the front portion of the shoe, each end member being provided with a screw-threaded receiving-hole, and a calk having a screw-shank screwed in each receiving-hole, and a fastening means adjustably connected with the central portion of the body of said forward retaining means and with the calks of said rear retaining members for securing the same in position upon the shoe, substantially as and for the purposes set forth.

7. In an attachment for horseshoes to prevent slipping, the combination, with a pair of rear retaining members, each member comprising a main body, a right-angled end piece, and a web, all arranged to embrace the heel end of a horseshoe, and a laterally-extending lug on said body, said lug being provided with a screw-threaded receiving-hole, of a calk provided with a screw-shank screwed into said receiving-hole, a forward retaining means consisting, essentially, of a main body having oppositely-extending end members, an upwardly-projecting retaining-lug upon each end member adapted to grasp the front portion of the shoe, each end member being provided with a screw-threaded receiving-hole, and a calk having a screw-shank screwed into each receiving-hole, a screw-threaded lug on the body of said forward retaining means, a screw-bolt in said screw-threaded lug, a cross-bar on said bolt, and connecting-links connected with the ends of said cross-bar and with the calks of said rear retaining members, all arranged for drawing the said rear retaining members toward the forward retaining means for securing the same in position upon the shoe, substantially as and for the purposes set forth.

In testimony that we claim the invention set forth above we have hereunto set our hands this 9th day of January, 1905.

JOHN WEBSTER TOWNSEND.
NELSON SAWYER TOWNSEND.

Witnesses:
FREDK. C. FRAENTZEL.
F. H. W. FRAENTZEL.